United States Patent [19]

Watanabe et al.

[11] 4,368,299

[45] Jan. 11, 1983

[54] EPOXY RESIN COMPOSITIONS

[75] Inventors: Katsuyoshi Watanabe, Nara; Makoto Andoh, Suita; Yasuhisa Saito, Toyonaka; Yasuteru Maeda, Ibaraki; Yoshiya Fukuyama, Minoo, all of Japan

[73] Assignee: Sumitomo Chemical Company, Limited, Osaka, Japan

[21] Appl. No.: 285,979

[22] Filed: Jul. 23, 1981

[30] Foreign Application Priority Data

Aug. 7, 1980 [JP] Japan ................................ 55-108960
Aug. 7, 1980 [JP] Japan ................................ 55-108961
Jan. 20, 1981 [JP] Japan ................................ 56-7578

[51] Int. Cl.$^3$ ....................... C08L 61/12; C08L 63/00
[52] U.S. Cl. ................................. 525/481; 523/400; 525/486
[58] Field of Search ........................... 525/481, 486

[56] References Cited

U.S. PATENT DOCUMENTS

| 3,472,915 | 10/1969 | Rider | 525/481 |
| 3,493,630 | 2/1970 | Salewsky | 525/486 |
| 3,563,850 | 2/1971 | Stackhouse | 525/481 |

FOREIGN PATENT DOCUMENTS

| 1444140 | 4/1969 | Fed. Rep. of Germany | 525/481 |
| 44-19037 | 8/1969 | Japan | 525/481 |
| 88517 | 1/1958 | Netherlands | 525/481 |
| 798174 | 7/1958 | United Kingdom | 525/481 |
| 120323 | 6/1959 | U.S.S.R. | 525/481 |
| 120324 | 6/1959 | U.S.S.R. | 525/481 |

*Primary Examiner*—Paul Lieberman
*Attorney, Agent, or Firm*—Stevens, Davis, Miller & Mosher

[57] ABSTRACT

A composition comprising an epoxy resin having at least two epoxy groups in the molecule and a hardener selected from the group consisting of (1) a resorcinol novolak having an unreacted resorcinol content of 10% by weight or less, (2) a mixed novolak of a resorcinol novolak and a monohydric phenol novolak having a total unreacted resorcinol and monohydric phenol content of 8% by weight or less, and (3) a resorcinol/monohydric phenol polycondensation novolak having a polycondensed resorcinol content of 30 mole % or more and a total unreacted resorcinol and monohydric phenol content of 8% by weight or less.

The composition is useful for moldings, laminates, paints, and adhesives with excellent thermal resistance, durability and electrical characteristics.

7 Claims, 4 Drawing Figures

EPOXY RESIN COMPOSITIONS

The present invention relates to an epoxy resin composition of excellent thermal resistance and durability after curing, and more specifically, it relates to an epoxy resin composition containing an improved hardener.

Epoxy resins are very superior in adhesion property, impact resistance, chemical resistance, oil resistance, solvent resistance and the like, so that they are finding wide applications in molding, lamination, and the production of paints, adhesives and the like. Currently, however, with remarkable progress of techniques, higher levels of curability, thermal resistance and durability are required in respective fields.

Various kinds of hardeners for epoxy resins have so far been used in practice. Of these, acid anhydride type hardeners have drawbacks such that the rate of curing is low and the cured products are inferior in water resistance and adhesion property. Amino type hardeners have drawbacks in that they are toxic and the cured products are greatly susceptible to long-term thermal deterioration, so that the products can not withstand prolonged use under severe conditions.

In order to overcome these drawbacks, novolak type phenol resins have been used as hardeners in the field of molding materials. With this type of hardener, however, recent demands for the upgrading of properties (e.g. thermal resistance, durability) and the diversification of properties (e.g. electrical characteristics) can not be satisfied. Consequently, there is an expectation for the development of novel hardeners, as a substitute for the phenol novolak type hardeners, having excellent thermal resistance and durability as well as excellent electrical characteristics and causing no toxicity problems.

In order to satisfy these demands, the inventors have extensively studied resorcinol novolaks which are high in reactivity with aldehydes and easy in commercial production. As a result, the inventors have found the fact that the incomplete curing of epoxy resins by the existing resorcinol novolaks is due to unreacted resorcinol commonly contained in the novolaks in an amount of about 20% by weight, and this is a reason why excellent characteristics can hardly be obtained and that the thermal resistance and other characteristics are remarkably improved by using as the hardener a resorcinol novolak or resorcinol/monohydric phenol copolycondensation novolak having a low content of unreacted resorcinol.

The present invention provides an epoxy resin composition comprising an epoxy resin having at least two epoxy groups in the molecule and a hardener selected from the group consisting of (1) a resorcinol novolak having an unreacted resorcinol content of 10% by weight or less, (2) a mixed novolak of a resorcinol novolak and a monohydric phenol novolak having a total unreacted resorcinol and monohydric phenol content of 8% by weight or less, and (3) a resorcinol/monohydric phenol polycondensation novolak having a polycondensed resorcinol content of 30 mole % or more and a total unreacted resorcinol and monohydric phenol content of 8% by weight or less.

The epoxy resin compositions of the present invention are characterized in that the content of unreacted resorcinol or the total content of unreacted resorcinol and monohydric phenol in the hardener is limited to less than a specified value. As clearly shown by the accompanying drawings, the epoxy resin compositions of the present invention are superior in characteristics after curing.

FIGS. 1 and 4 show the durability of formed products, as expressed by a change in volume resistivity by boiling in ion-exchanged water, with volume resistivity ($\Omega \cdot m$) as the ordinate and the period (day) of boiling in ion-exchanged water as the abscissa. In FIG. 1, a curve (a) shows the durability of formed products produced with the present hardeners B and C, and a curve (b) shows that of formed products produced with a control hardener A and the previous phenol novolak. In FIG. 4, products produced with the present hardener E, present hardener G and a control hardener F, respectively.

Figure 1:
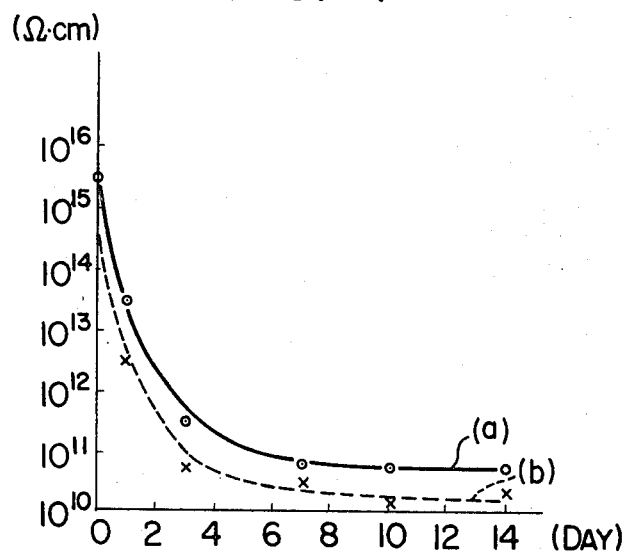

The present invention will be illustrated in detail.

The epoxy resins used in the present invention are those having two or more epoxy groups in the molecule, and include, for example, polyglycidyl ether type epoxy resins produced by reaction of a polyhydric phenol (e.g. bisphenol A, halogenated bisphenol A, catechol, resorcinol) with epichlorohydrin, epoxy novolak resins produced by reaction of a novolak type phenol resin with epichlorohydrin, epoxidized olefin and epoxidized polybutadiene produced according to a peroxidation process to epoxidize the unsaturated bond present in the olefin or polybutadiene, and glycidylamine type epoxy resins produced by reaction of an amine compound with epichlorohydrin.

The improved hardeners of the present invention can easily be produced by usual methods well known to those skilled in the art. That is, the resorcinol novolak (1) may be synthesized by reacting resorcinol with an aldehyde (about 0.3 to 0.9 mole per mole of resorcinol) in the presence or absence of an acid catalyst such as oxalic acid, formic acid, sulfuric acid, hydrochloric acid, etc. at a temperature of about 20° to 150° C. for 30 minutes to 10 hours to obtain a resorcinol novolak, and removing unreacted resorcinol therefrom to a content of 10 wt.% or less by a suitable method such as heating in vacuo, distillation, washing or the like.

The reaction may be carried out in a solvent such as ketones (e.g. methyl ethyl keton, methyl isobutyl ketone, etc.), esters (e.g. methyl acetate, ethyl acetate, etc.) and alcohols (e.g. methanol, ethanol, etc.).

It is preferred to limit the content of unreacted resorcinol to 5 wt.% or less from the viewpoint of characteristics of the cured product. When the content exceeds 10 wt.%, the cured product is not sufficient in thermal resistance and other characteristics.

The resorcinol novolak thus obtained may be used alone as a hardener for epoxy resins, and also it may be used as a mixture with a known monohydric phenol novolak obtained from a monohydric phenol and an aldehyde (e.g. phenol novolak, o, m- or p-cresol novolak, etc.). In this case, the content of unreacted phenols, i.e., the total content of unreacted resorcinol and unreacted monohydric phenol, in this mixed novolak is 8 wt.% or less, preferably, 5 wt.% or less. When the total content exceeds 8 wt.%, the thermal resistance and other characteristics of the cured product are not sufficient. The limitation of the total content is significant particularly for the mixed novolak having a high proportion of the monohydric phenol novolak.

The content of the resorcinol novolak in this mixed novolak is 10 wt.% or more. When the content is less than 10 wt.%, the cured product of the epoxy resin does not show sufficient improvement in characteristics such as thermal resistance. The resorcinol novolak has a high softening temperature, and tends to increase the viscosity of the mixed novolak or the epoxy resin composition to be ultimately obtained. Accordingly, if the workability is regarded as important, the content of the resorcinol novolak is preferably limited to 80 wt.% or less.

The resorcinol/monohydric phenol copolycondensation novolak (2) can be synthesized by reacting a mixture of a monohydric phenol and 30 mole % or more of resorcinol with an aldehyde in the presence or absence of a catalyst in a manner known for the production of conventional novolak type phenol resins to obtain a resorcinol/monohydric phenol copolycondensation novolak, and then reducing the total content of unreacted resorcinol and unreacted monohydric phenol to 8 wt.% or less by a suitable method such as heating in vacuo, distillation, concentration, steam distillation, steam concentration, washing or the like.

Alternatively, the copolycondensation novolak (2) may be produced by reacting the monohydric phenol with an aldehyde (about 1 to 3 moles per mole of the monohydric phenol) using an alkali catalyst such as sodium hydroxide, potassium hydroxide, calcium hydroxide and the like in the presence or absence of a solvent such as ketones (e.g. methyl ethyl ketone, methyl isobutyl ketone, etc.), esters (e.g. methyl acetate, ethyl acetate, etc.), aromatic hydrocarbons (e.g. benzene, toluene, xylene, etc.) and the like at a temperature of about 40° to 150° C. for about 1 to 10 hours, subjecting the resulting methylolation reaction mixture which may be neutralized or not and then if desired admixed with an acid catalyst, to copolycondensation with 30 mole % or more of resorcinol, and then reducing the total content of unreacted resorcinol and monohydric phenol in the same manner as above. The copolycondensation may be carried out at a temperature of about 50° to 200° C. for about 30 minutes to 10 hours in the presence or absence of the same solvent as described above.

In the resorcinol/monohydric phenol copolycondensation novolak used in the present invention, when the content of copolycondensed resorcinol is less than 30 mole %, the cured product of the epoxy resin does not exhibit sufficient improvement in characteristics such as thermal resistance and durability. From the standpoints of the cost of said copolycondensation novolak (since resorcinol is generally more expensive than a monohydric phenol) as well as an improving-effect for the electrical characteristics of the cured product, the content of the copolycondensed resorcinol is preferably 80 mole % or less.

Also, the content of unreacted phenols, i.e., the total content of unreacted resorcinol and unreacted monohydric phenols, in said copolycondensation novolak is 8 wt.% or less, preferably, 5 wt.% or less. When the total content exceeds 8 wt.%, the thermal resistance and other characteristics of the cured product are not sufficiently improved. The limitation of the total unreacted phenols content is significant particularly for the copolycondensation novolak having a high proportion of the monohydric phenol.

In the foregoing production of the improved hardeners of the present invention, the monohydric phenol usable includes for example phenol, o-cresol, m-cresol, p-cresol, 3,5-xylenol, 2,3-xylenol, 2,5-xylenol, o-chlorophenol, m-chlorophenol, p-chlorophenol, 3-methyl-5-isobutylphenol, 3-methyl-6-isobutylphenol, p-tert-butylphenol, p-tert-octylphenol and mixtures thereof.

The aldehyde usable includes for example formaldehyde, acetaldehyde, benzaldehyde, butylaldehyde, furfural and the so-called aldehyde precursors generating aldehyde during reaction, such as paraformaldehyde, formalin, trioxan, paraaldehyde, formal, acetal and mixtures thereof.

In the present invention, a preferred mixing weight ratio of the epoxy resin to the present improved hardener, i.e. the resorcinol novolak, the mixed novolak or the copolycondensation novolak is such that the ratio of the number of phenolic hydroxyl groups in the novolak to that of the epoxy groups in the resin ranges from 0.5:1 to 1.5:1.

The epoxy resin composition of the present invention may contain a curing accelerator such as cyclic amines and their salts (e.g. N-aminoethylpiperazine, morpholine, morpholinium p-toluenesulfonate), dimethylaminomethyl group-containing phenols [e.g. dimethylaminomethylphenol, 2,4,6-tris(dimethylaminomethyl)phenol], imidazoles (e.g. 2-methylimidazole, 2-ethylimidazole, 2-ethyl-4-methylimidazole, 2-ethyl-4-ethylimidazole, N-butylimidazole), benzyldimethylamine and its salts. The amount of the accelerator used is preferably about 0.1 to 2 wt.% based on the epoxy resin.

Also, other hardeners commonly used such as anhydrides, phenol novolaks and etc. may be incorporated in the present epoxy composition.

The epoxy resin compositions of the present invention are useful with excellent characteristics for molding, lamination, injection molding and production of paints and adhesives, and may further contain fillers, release agents, coloring agents and the like according to respective intended uses. As commonly used fillers, there are given for example silica, talc, calcium carbonate, asbestos powder, alumina, silica gel, glass pieces and glass fibers. The release agents include for example montan wax, stearic acid and its metallic salts, and the coloring agents include various dyes and pigments.

The present invention is illustrated with reference to the following Reference Examples and Examples. All parts in the Examples are by weight.

PREPARATION OF HARDENER

Reference Example 1

Resorcinol (550 parts) and water (110 parts) were put into a glass flask and heated to 70° C. Thereafter, a 37% formalin (244 parts) was added dropwise over 4 hours while maintaining the temperature at 70° to 80° C., and the reaction system was then kept at the same temperature for a further 1 hour. Methyl isobutyl ketone (220 parts) was added, and then water was removed azeotropically from the system while recycling the methyl isobutyl ketone. At the time when the temperature reached 140° C., azeotropic distillation was replaced by simple distillation to distil out methyl isobutyl ketone. Finally, the system was kept at a temperature of 160° C.

under reduced pressure of 30 mm Hg for 1 hour to obtain 593 parts of a resin. The solftening point of the resin was 114° C. (ring and ball method), and the unreached resorcinol content of the resin was 18.7%. This resin was taken as sample A.

Reference Example 2

Reference Example 1 was repeated, except that the final concentration was made more severely at a temperature of 170° to 180° C. under reduced pressure of 3 mmHg. Thus, a resin having a softening point of 129° C. and an unreacted resorcinol content of 8.4% was obtained. This resin was taken as sample B. By further additional concentration, a resin having a softening point of 136° C. and an unreacted resorcinol content of 4.0% was obtained. This resin was taken as sample C.

Reference Example 3

Phenol (329 parts), toluene (329 parts) and 88% paraformaldehyde (127.8 parts) were put into a glass flask and heated. A 5 N aqueous sodium hydroxide solution (15 parts) was then added dropwise over 60 minutes while maintaining the temperature at 60° to 70° C., and the reaction system was kept at 70° C. for a further 2 hours. After cooling, the system was neutralized with oxalic acid (5 parts) to make the pH 4 or less, and then washed three times with water (each 400 parts) to remove the produced salt. Resorcinol (165 parts) was then added. The system was heated, and both water present from the beginning and water formed by reaction were removed azeotropically from the system while recycling the toluene. At the time when the temperature reached 120° C., azeotropic distillation was replaced by simple distillation to distil out toluene. Finally, the system was kept at a temperature of 160° C. under reduced pressure of 20 mmHg for 1 hour to obtain 520 parts of a resin. The solftening point of the resin was 126° C. (ring and ball method), and the unreacted phenols content of the resin was 4.8%. This resin was taken as sample D.

Reference Example 4 m-Cresol (239 parts), toluene (239 parts) and 88% paraformaldehyde (145 parts) were put into a glass flask and heated to 60° C. Thereafter, a 5 N aqueous sodium hydroxide solution (13.1 parts) was then added dropwise over 2 hours while maintaining the temperature of 60° to 70° C., and the reaction system was kept at the same temperature for a further 2 hours. After cooling to 30° C. or less, the system was neutralized with oxalic acid (3.48 parts), and washed several times with water (each 400 parts) to remove the produced salt.

Resorcinol (374 parts) was then added. The system was heated, and water was removed azeotropically from the system while recycling the toluene.

At the time when the temperature reached 120° C., azeotropic distillation was replaced by simple distillation to distil out toluene. Finally, the system was kept at a temperature of 150° C. under reduced pressure of 40 mmHg for 1 hour to obtain 728 parts of a resin. The softening point of the resin was 121° C. (ring and ball method), and the unreacted phenols content of the resin was 4.0%. This resin was taken as sample E.

Reference Example 5

Reference Example 4 was repeated to obtain a copolycondensation novolak, except that 478 parts of m-cresol, 478 parts of toluene, 266 parts of 88% paraformaldehyde and 726 parts of resorcinol were used.

The resin had a softening point of 109° C. and an unreacted phenols content of 10.2%. This resin was taken as sample F. A part of this resin was further concentrated to obtain a resin having a softening point of 127° C. and an unreacted phenols content of 6.7%. This re-concentrated resin was taken as sample G.

Reference Example 6

Reference Example 4 was repeated to obtain a copolycondensation novolak, except that 141 parts of phenol, 141 parts of toluene, 119 parts of 88% paraformaldehyde and 385 parts of resorcinol were used. The resin had a softening point of 126° C. and an unreacted phenols content of 3.0%. This resin was taken as sample H.

Reference Example 7

A phenol novolak was obtained in a usual manner using 235 parts of phenol, 235 parts of toluene and 152 parts of 37% formalin.

The resin had a softening point of 108° C. and an unreacted phenol content of 3.0%. This resin was taken as sample I.

Reference Example 8

Reference Example 4 was repeated, except that 376 parts of phenol, 110 parts of resorcinol and 263.5 parts of 37% formalin were used, whereby a resin having a softening point of 119° C. and an unreacted phenols content of 3.9% was obtained. This resin was taken as sample J.

Reference Example 9

Reference Example 1 was repeated, except that after methyl isobutyl ketone was distilled out by simple distillation, the system was finally kept at a temperature of 180° C. under reduced pressure of 5 mmHg for 1 hour to obtain 539 parts of a resin. This resin had a softening point of 144° C. (ring and ball method), a hydroxyl equivalent of 60 and an unreacted resorcinol content of 9.0 wt.%. This resin was taken as sample K.

Reference Example 10

A phenol novolak was obtained in a usual manner using 235 parts of phenol, 235 parts of toluene and 152 parts of 37% formalin. The resin had a softening point of 108° C., a hydroxyl equivalent of 105 and an unreacted phenol content of 3.0%. This resin was taken as sample L.

Examples 1 to 4 and Comparative Examples 1 to 4

(1) Preparation of Molding Compounds

Using the samples A, B and C obtained by the foregoing Reference Examples and a conventional phenol resin, molding compounds were prepared according to formulations as shown in Table 1.

TABLE 1

| | | Comparative Example 1 | Comparative Example 2 | Example 1 | Example 2 |
|---|---|---|---|---|---|
| Hardener | Kind | Phenol | A | B | C |

TABLE 1-continued

|  |  | Comparative Example 1 | Comparative Example 2 | Example 1 | Example 2 |
|---|---|---|---|---|---|
|  |  | novolak* |  |  |  |
|  | Amount (part) | 41.6 | 26.9 | 26.9 | 26.9 |
| Epoxy resin | Sumiepoxy ESCN-220L** (part) | 78.4 | 93.1 | 93.1 | 93.1 |
| Filler and others | Silica powder (part) | 280 | 280 | 280 | 280 |
|  | Calcium stearate (part) | 2 | 2 | 2 | 2 |
|  | 2-Ethyl-4-methylimidazole (part) | 0.16 | 0.18 | 0.18 | 0.18 |

Note:
The blending ratio of the hardener to the epoxy resin was adjusted so as to render the equivalent ratio of the —OH group of the hardener to the epoxy group of the epoxy resin 1:1.
*Phenol novolak having a softening point of 110° C.
**o-Cresol novolak type epoxy resin (epoxy equivalent 209) sold by Sumitomo Chemical Co.

(2) Molding and Measurement of Physical Properties

The compounds prepared by the foregoing formulation were kneaded on a roll and pressed into test pieces on a press.

Kneading condition: 100° C.–110° C., 10 minutes
Pressing condition: about 180° C., 40 kg/cm$^2$, 10 minutes' curing; post-curing: 200° C., 3 hours The physical properties of the molded products are as shown in Table 2.

The physical properties were measured according to JIS K 6911 and ASTM. Tg (glass transition temperature) was measured by TMA (thermomechanical analysis). Durability was evaluated by a change in the volume resistivity of the molded products by boiling in ion-exchanged water. The results are shown in FIG. 1.

(3) Evaluation by Means of Cast Plate

Using as hardener the samples A, B and C produced by Reference Examples and a conventional-type phenol novolak, resin compositions for casting were prepared by formulations shown in Table 3. The composition was poured into a casting mold and completely cured into a cast plate by stepwise rise in temperature: 100° C. × 2 hrs., 150° C. × 1 hr. and 200° C. × 4 hrs. The physical properties of the cast plate are shown in Table 4.

TABLE 2

|  |  | Unit | Comparative Example 1 | Comparative Example 2 | Example 1 | Example 2 |
|---|---|---|---|---|---|---|
| Hardener | Kind |  | Phenol novolak | A | B | C |
|  | Unreacted resorcinol | % | (Unreacted phenol) 3.8 | 18.7 | 8.4 | 4.0 |
| Physical property of molded product | Heat distortion temperature (bending load, 100 kg/cm$^2$) | °C. | 181 | 230 | >230 | >230 |
|  | Tg (by TMA) | °C. | 170 | 194 | 220 | 224 |
|  | Boiling water absorption (100° C. × 2 hrs) | % | 0.07 | 0.104 | 0.062 | 0.055 |
|  | Volume resistivity (normal state) | Ω·cm | $4.2 \times 10^{15}$ | $1.4 \times 10^{15}$ | $1.9 \times 10^{15}$ | $1.0 \times 10^{16}$ |
|  | Volume resistivity (after 100° C. × 2 hrs' boil) | Ω·cm | $3.7 \times 10^{14}$ | $5.5 \times 10^{13}$ | $5.2 \times 10^{14}$ | $7.9 \times 10^{14}$ |

TABLE 3

|  |  | Comparative Example 3 | Comparative Example 4 | Example 3 | Example 4 |
|---|---|---|---|---|---|
| Hardener | Kind | Phenol novolak* | A | B | C |
|  | Amount (part) | 54 | 31 | 32 | 33 |
| Epoxy resin | Sumiepoxy ELA-128** (Sumitomo Chemical Co.) (part) | 100 | 100 | 100 | 100 |
| Hardening accelerator | 2-Ethyl-4-methylimidazole (part) | 0.1 | 0.1 | 0.1 | 0.1 |

Note:
The blending ratio of the hardener to the epoxy resin was adjusted so as to render the equivalent ratio of the —OH group of the hardener to the epoxy group of the epoxy resin 1:1.
*Phenol novolak having a softening point of 110° C.
**Epoxy resin sold by Sumitomo Chemical Co.

TABLE 4

|  |  | Unit | Comparative Example 3 | Comparative Example 4 | Example 3 | Example 4 |
|---|---|---|---|---|---|---|
| Hardener | Kind |  | Phenol novolak | A | B | C |
|  | Unreacted resorcinol | % | 3.0 (unreacted phenol) | 18.7 | 8.4 | 4.0 |
| Physical | Heat distortion temper- | °C. | 131 | 152 | >220 | >220 |

TABLE 4-continued

|  | | Unit | Comparative Example 3 | Comparative Example 4 | Example 3 | Example 4 |
|---|---|---|---|---|---|---|
| property of cast plate | ature | | | | | |
| | Volume resistivity (normal state) | Ω·cm | $1.2 \times 10^{16}$ | $0.66 \times 10^{16}$ | $8.3 \times 10^{16}$ | $8.2 \times 10^{16}$ |
| | Volume resistivity (after 100° C. × 2 hrs' boil) | Ω·cm | $4.7 \times 10^{13}$ | $1.6 \times 10^{14}$ | $5.1 \times 10^{15}$ | $9.3 \times 10^{15}$ |

The physical properties were measured according to JIS K 6911 and ASTM.

Examples 5 to 8 and Comparative Examples 5 to 7

Figure 2:
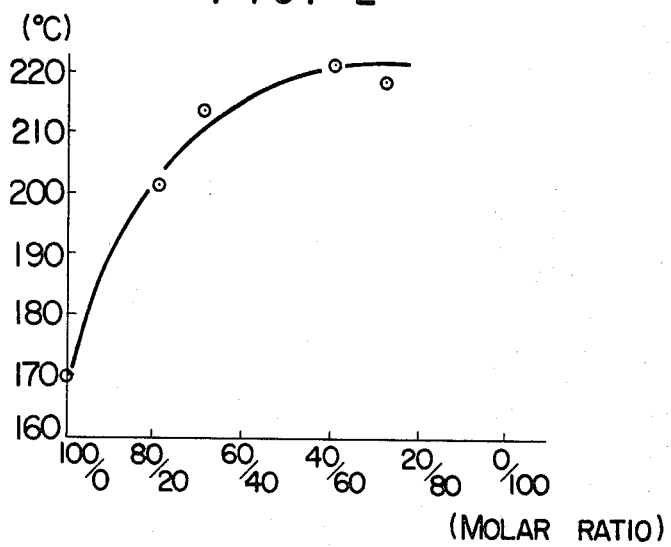
FIG. 2 shows a change in the glass transition temperature of formed products according to a difference in the molar ratio of monohydric phenol to resorcinol, with glass transition temperature as the ordinate and molar ratio of monohydric phenol to resorcinol as the abscissa.
Figure 3:
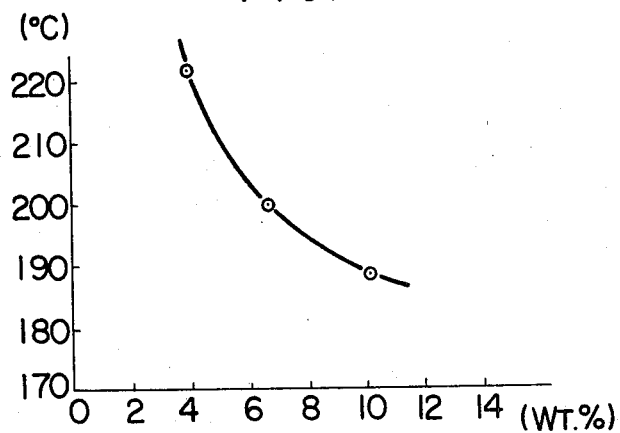
FIG. 3 shows a change in the glass transition temperature of formed products according to a difference in the total content of unreacted phenols in a m-cresol/resorcinol copolycondensation novolak (molar ratio, 40:60), with glass transition temperature as the ordinate and unreacted phenols content as the abscissa.
Figure 4:
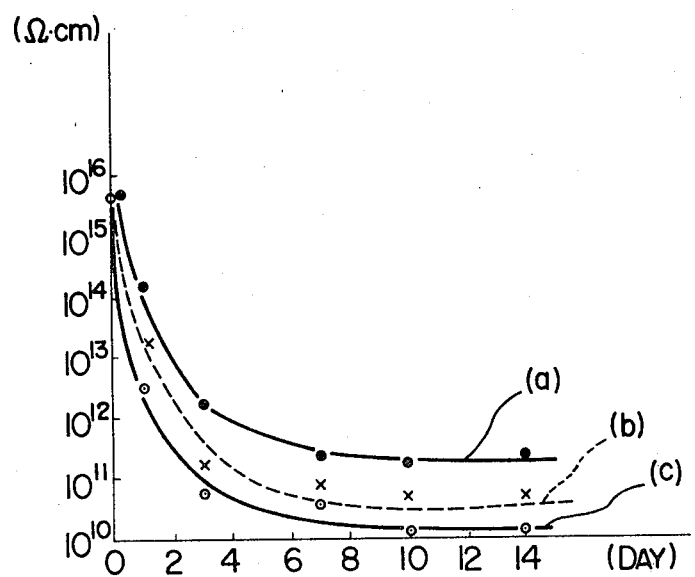

The characteristics of the plates are shown in Table 6 and FIGS. 2, 3 and 4.

TABLE 5

| | | Formulation of molding compounds | | | | | | |
|---|---|---|---|---|---|---|---|---|
| | Unit | Comparative Example 5 | Comparative Example 6 | Example 5 | Example 6 | Comparative Example 7 | Example 7 | Example 8 |
| Hardener | | I | J | D | E | F | G | H |
| Amount of hardener used | Part | 41.6 | 36.1 | 33.7 | 31.0 | 30.6 | 30.6 | 29.0 |
| Epoxy resin (Sumiepoxy ESCN-220L) | Part | 78.4 | 83.9 | 86.3 | 89.0 | 89.4 | 89.4 | 91.0 |
| Catalyst (2-ethyl-4-methylimidazole) | Part | 0.16 | 0.16 | 0.16 | 0.17 | 0.18 | 0.18 | 0.18 |
| Filler (silica powder) | Part | 280 | 280 | 280 | 280 | 280 | 280 | 280 |
| Release agent (calcium stearate) | Part | 2 | 2 | 2 | 2 | 2 | 2 | 2 |

Note:
The equivalent ratio of the —OH group of the hardener to the epoxy group of the epoxy resin was fixed to 1:1.

TABLE 6

| | | Unit | Comparative Example 5 | Comparative Example 6 | Example 5 | Example 6 | Comparative Example 7 | Example 7 | Example 8 |
|---|---|---|---|---|---|---|---|---|---|
| Hardener | | | I | J | D | E | F | G | H |
| Molar ratio of monohydric phenols/resorcinol copoly-condensation | | Molar ratio | 100/0 | 80/20 | 70/30 | 40/60 | 40/60 | 40/60 | 30/70 |
| Content of unreacted phenols | | wt. % | 3.0 | 3.9 | 4.2 | 4.0 | 10.2 | 6.7 | 3.0 |
| Physical property of molded product | Heat distortion temperature (bending load, 100 kg/cm²) | °C. | 181 | 216 | >230 | >230 | 198 | 222 | >230 |
| | Tg (by TMA) | °C. | 170 | 202 | 214 | 222 | 188 | 200 | 219 |
| | Boiling water absorption (100° C. × 2 hrs) | % | 0.070 | 0.079 | 0.066 | 0.055 | 0.081 | 0.056 | 0.060 |
| | Volume resistivity (normal state) | Ω·cm | $4.2 \times 10^{15}$ | $5.0 \times 10^{15}$ | $8.5 \times 10^{15}$ | $8.4 \times 10^{15}$ | $6.5 \times 10^{15}$ | $7.7 \times 10^{15}$ | $7.6 \times 10^{15}$ |
| | Volume resistivity (after 100° C. × 2 hrs' boil) | Ω·cm | $3.7 \times 10^{14}$ | $4.5 \times 10^{13}$ | $7.2 \times 10^{14}$ | $9.8 \times 10^{14}$ | $6.2 \times 10^{13}$ | $4.5 \times 10^{14}$ | $8.0 \times 10^{14}$ |

Note:
The physical properties were measured according to JIS K 6911 and ASTM.
The glass transition temperature was measured by TMA (thermo-mechanical analysis).
Durability was evaluated by a change in the volume resistivity of the molded products by boiling in ion-exchanged water.
The results are shown in FIG. 4.

Preparation and Molding of Molding Compounds

Using the samples (as hardener) obtained in the foregoing Reference Examples, molding compounds were prepared by formulations shown in Table 5. The compound was thoroughly kneaded on a roll kneader and then pressed into a molded plate on a press, followed by post-curing.
Pressing: 180° C.×40 kg/cm², 10 minutes
Post-curing: 200° C.×3 hours Examples 9 to 12 and Comparative Examples 8 to 10

Evaluation by Means of Cast Plate

Using as hardener the samples D, E, F, G, H, I and J prepared in the foregoing Reference Examples, resin compositions for casting were prepared by formulations shown in Table 7. The compositions was poured into a casting mold and completely cured into a cast plate by a stepwise rise in temperature: 100° C.×2 hrs, 150° C.×1 hr and 200° C.×4 hrs. The physical properties of the cast plate are shown in Table 8.

TABLE 7

| | Comparative Example 8 | Comparative Example 9 | Example 9 | Example 10 | Comparative Example 10 | Example 11 | Example 12 |
|---|---|---|---|---|---|---|---|
| Hardener (kind) | I | J | D | E | F | G | H |
| Amount of hardener (part) | 54 | 44 | 42 | 40 | 40 | 40 | 38 |

TABLE 7-continued

|  | Comparative Example 8 | Comparative Example 9 | Example 9 | Example 10 | Comparative Example 10 | Example 11 | Example 12 |
|---|---|---|---|---|---|---|---|
| Sumiepoxy ELA-128 (Sumitomo Chemical Co.) (part) | 100 | 100 | 100 | 100 | 100 | 100 | 100 |
| Hardening accelerator (part) (2-ethyl-4-methylimidazole) | 0.1 | 0.1 | 0.1 | 0.1 | 0.1 | 0.1 | 0.1 |

Note:
The equivalent ratio of the —OH group of the hardener to the epoxy group of the main component was fixed to 1:1.

TABLE 8

|  | Unit | Comparative Example 8 | Comparative Example 9 | Example 9 | Example 10 | Comparative Example 10 | Example 11 | Example 12 |
|---|---|---|---|---|---|---|---|---|
| Hardener |  | I | J | D | E | F | G | H |
| Molar ratio of monohydric phenols/resorcinol copolycondensation |  | 100/0 | 80/20 | 70/30 | 40/60 | 40/60 | 40/60 | 30/70 |
| Content of unreacted phenols | % | 3.0 | 3.9 | 4.2 | 4.0 | 10.2 | 6.7 | 3.0 |
| Heat distortion temperature | °C. | 131 | 148 | 212 | >220 | 151 | >220 | >220 |
| Volume resistivity (normal state) | Ω·cm | $1.2 \times 10^{16}$ | $2.0 \times 10^{16}$ | $6.6 \times 10^{16}$ | $8.1 \times 10^{16}$ | $5.5 \times 10^{16}$ | $7.1 \times 10^{16}$ | $8.7 \times 10^{16}$ |
| Volume resistivity (after 100° C. × 2 hrs' boil) | Ω·cm | $4.7 \times 10^{13}$ | $0.11 \times 10^{15}$ | $1.3 \times 10^{15}$ | $7.3 \times 10^{15}$ | $1.4 \times 10^{15}$ | $3.4 \times 10^{15}$ | $7.2 \times 10^{15}$ |

Note:
The physical properties were measured according to JIS K 6911 and ASTM.

Examples 13 to 15 and Comparative Examples 11 and 12

(Mixed) novolaks of a composition as shown in Table 9 were prepared using resorcinol novolak and phenol novolak prepared in Reference Examples 9 and 10, respectively. With these (mixed) novolaks as hardener, molding compounds were prepared by formulations shown in Table 10. The compound was thoroughly kneaded on a roll kneader and then pressed into a molded plate on a press, followed by post-curing.

Pressing: 180° C., 40 kg/cm², 10 minutes
Post-curing: 200° C., 3 hours

The characteristics of the molded plates are shown in Table 11.

TABLE 9

|  |  | Comparative Example 11 | Comparative Example 12 | Example 13 | Example 14 | Example 15 |
|---|---|---|---|---|---|---|
| L:K mixing ratio (weight) |  | 0/100 | 100/0 | 85/15 | 50/50 | 20/80 |
| Unreacted resorcinol content | wt % | 9.0 | 0 | 1.4 | 4.5 | 7.2 |
| Unreacted phenol content | wt % | 0 | 3.0 | 2.6 | 1.5 | 0.6 |
| Total content of unreacted phenols | wt % | 9.0 | 3.0 | 4.0 | 6.0 | 7.8 |
| Softening point of (mixed) novolak | °C. | 144 | 108 | 115 | 127 | 138 |

TABLE 10

|  |  | Comparative Example 11 | Comparative Example 12 | Example 13 | Example 14 | Example 15 |
|---|---|---|---|---|---|---|
| Amount of (mixed) novolak (hardener) | Part | 26.8 | 40.0 | 37.3 | 32.1 | 28.7 |
| Epoxy resin (Sumiepoxy ESCN-220L) | Part | 93.2 | 80.0 | 82.7 | 87.9 | 91.3 |
| Catalyst* | Part | 0.37 | 0.32 | 0.36 | 0.35 | 0.33 |
| Filler (silica powder) | Part | 280 | 280 | 280 | 280 | 280 |
| Release agent (calcium stearate) | Part | 2 | 2 | 2 | 2 | 2 |

Note:
The equivalent ratio of the —OH group of the novolak (hardener) to the epoxy group of the epoxy resin was fixed to 1:1.
*Catalyst: commercially available 2-ethyl-4-methylimidazole

TABLE 11

|  |  | Unit | Comparative Example 11 | Comparative Example 12 | Example 13 | Example 14 | Example 15 |
|---|---|---|---|---|---|---|---|
| Physical property of molded product | Heat distortion temperature (bending load, 100 kg/cm²) | °C. | 224 | 186 | 199 | 228 | >230 |
|  | Tg (by TMA)* | °C. | 216 | 178 | 188 | 220 | 221 |
|  | Boiling water absorption (100° C. × 2 hrs) | % | 0.088 | 0.090 | 0.096 | 0.076 | 0.090 |
|  | Volume resistivity | Ω·cm | $1.9 \times 10^{15}$ | $1.0 \times 10^{16}$ | $6.1 \times 10^{15}$ | $2.5 \times 10^{15}$ | $3.9 \times 10^{15}$ |

TABLE 11-continued

| | | Unit | Comparative Example 11 | Comparative Example 12 | Example 13 | Example 14 | Example 15 |
|---|---|---|---|---|---|---|---|
| | (normal state) Volume resistivity (after 2 hrs' boil in ion-exchanged water) | $\Omega \cdot cm$ | $5.2 \times 10^{14}$ | $4.4 \times 10^{13}$ | $2.3 \times 10^{14}$ | $5.4 \times 10^{14}$ | $2.0 \times 10^{14}$ |
| Process-ability | Evaluation** | | X | ⊙ | ⊙ | ⊙ | ○ |
| | Flowability of hardener on Flow tester at 90° C. (load, 10 kg/cm²; nozzle, 1 mmφ) | mm/s | 0.012 | 0.049 | 0.046 | 0.041 | 0.033 |

Note:
The physical properties were measured according to JIS K 6911 and ASTM.
*Glass transition temperature (Tg) was measured on TMA (thermo-mechanical analysis).
**Processability was evaluated by flowability and tackiness on kneading on a roll, and it was graded as follows:
X Poor (processing on a roll is difficult);
○ Good;
⊙ Very good.

What is claimed is:

1. A composition comprising an epoxy resin having at least two epoxy groups in the molecule and a hardener selected from the group consisting of (1) a resorcinol novolak having an unreacted resorcinol content of 10% by weight or less, (2) a mixed novolak of a resorcinol novolak and a monohydric phenol novolak having a total unreacted resorcinol and monohydric phenol content of 8% by weight or less wherein the mixed novolak has a resorcinol novolak content of 10% by weight or more, and (3) a resorcinol/monohydric phenol polycondensation novolak having a polycondensed resorcinol content of 30 mole % or more and a total unreacted resorcinol and monohydric phenol content of 8% by weight or less, wherein the weight ratio of the epoxy resin to the hardener is such that a ratio of the number of phenolic hydroxyl groups present in the hardener to that of the epoxy groups present in the epoxy resin ranges from 0.5:1 to 1.5:1.

2. The composition according to claim 1, wherein the epoxy resin is one member selected from the group consisting of polyglycidyl ether type epoxy resins, epoxy novolak resins, epoxidized olefins, epoxidized polybutadiene and glycidylamine type epoxy resins.

3. The composition according to claim 1, wherein the resorcinol novolak is produced by reacting resorcinol with an aldehyde in the presence or absence of a catalyst and then removing unreacted resorcinol.

4. The composition according to claim 1, wherein the monohydric novolak is produced by reacting a monohydric phenol with an aldehyde in the presence or absence of a catalyst, and then removing unreacted monohydric phenol.

5. The composition according to claim 1, wherein the polycondensation novolak is produced by reacting a monohydric phenol and 30 mol % or more of resorcinol with an aldehyde in the presence or absence of a catalyst, and then removing unreacted monohydric phenol and resorcinol.

6. The composition according to claims 4 or 5, wherein the monohydric phenol is phenol, o-, m- or p-cresol, 2,3-, 2,5- or 3,5-xylenol, o-, m- or p-chlorophenol, 3-methyl-5 or 6-isobutylphenol, p-tert-butylphenol, p-tert-octylphenol or a mixture thereof.

7. The composition according to claim 1, wherein the composition further contains at least one member selected from the group consisting of other hardeners, curing accelerators, fillers, release agents, and coloring agents.

* * * * *